June 21, 1960  R. J. SULLIVAN ET AL  2,941,749
JET PROPELLED CONVERTIPLANE WITH JET DRIVEN ROTOR
Filed April 6, 1955  2 Sheets-Sheet 1

INVENTORS
ROBERT J. SULLIVAN
HARVEY J. NOZICK
BY
M. B. Tasker
ATTORNEY

United States Patent Office 2,941,749
Patented June 21, 1960

2,941,749

JET PROPELLED CONVERTIPLANE WITH JET DRIVEN ROTOR

Robert J. Sullivan, Bridgeport, and Harvey J. Nozick, Fairfield, Conn., assignors to United Aircraft Corporation, East Hartford, Conn., a corporation of Delaware Filed Apr. 6, 1955, Ser. No. 499,680

3 Claims. (Cl. 244—6)

This invention relates to convertiplanes, a type of aircraft capable of hovering flight as well as high speed airplane flight, and has as one of its objects to provide an improved propulsion system for such an aircraft.

A further object of the invention is to utilize one or more turbojet engines to provide the direct thrust for forward flight and a remote turbine driven by the gas discharged by the turbojet engines for driving a compressor which provides compressed air for driving a reaction rotor in hovering flight.

A further object of the invention is generally to improve the construction and operation of convertiplanes.

These and other objects and advantages of the invention will be evident or will be pointed out in connection with the accompanying detailed description of two forms which the invention may take in practice as illustrated in the accompanying drawings.

Figure 1:
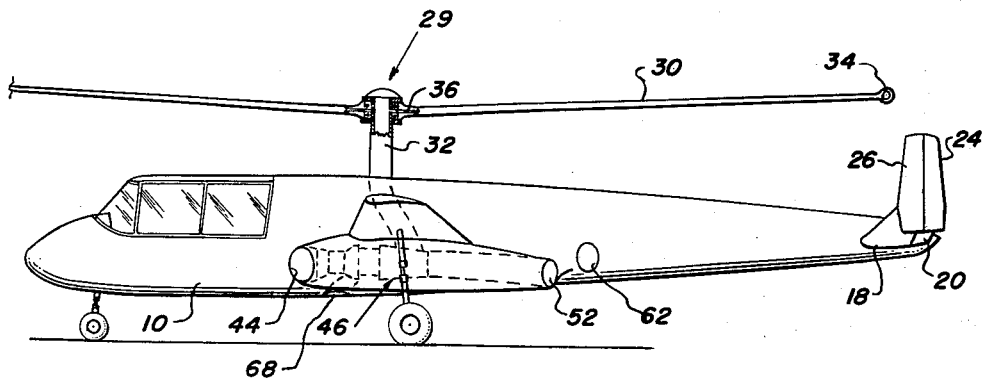
Fig. 1 is a side elevation of a convertiplane embodying the invention and utilizing two turbojet engines.
Figure 2:
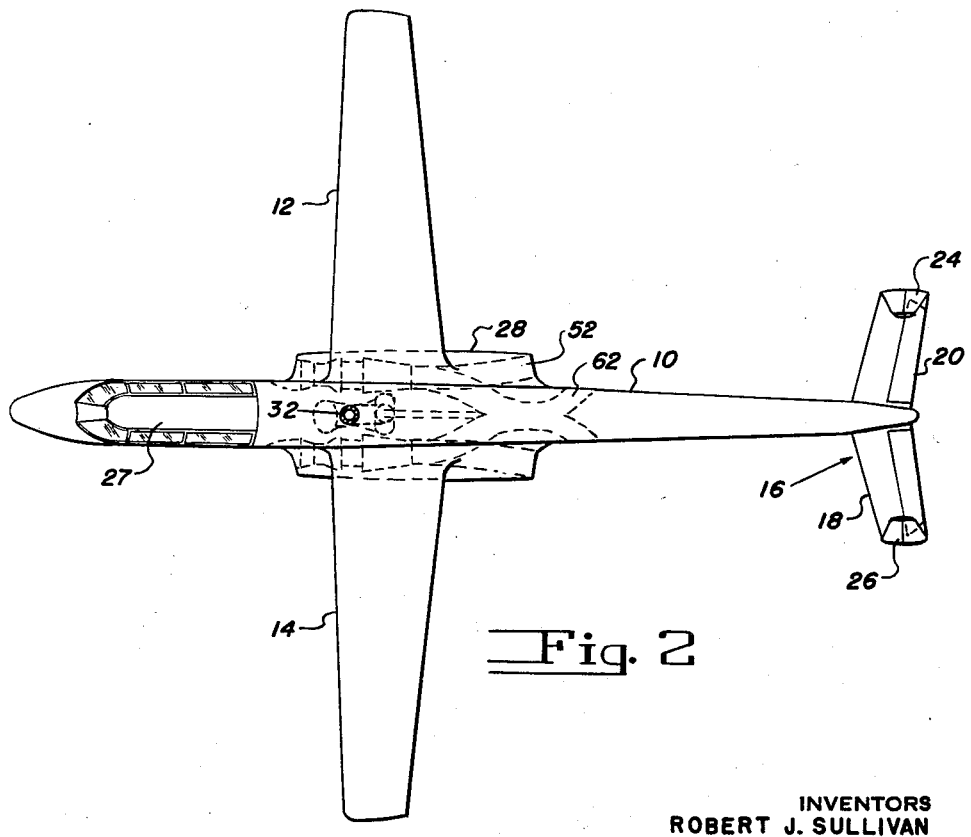
Fig. 2 is a plan view of the convertiplane of Fig. 1 with the lift rotor omitted for clarity.
Figure 3:
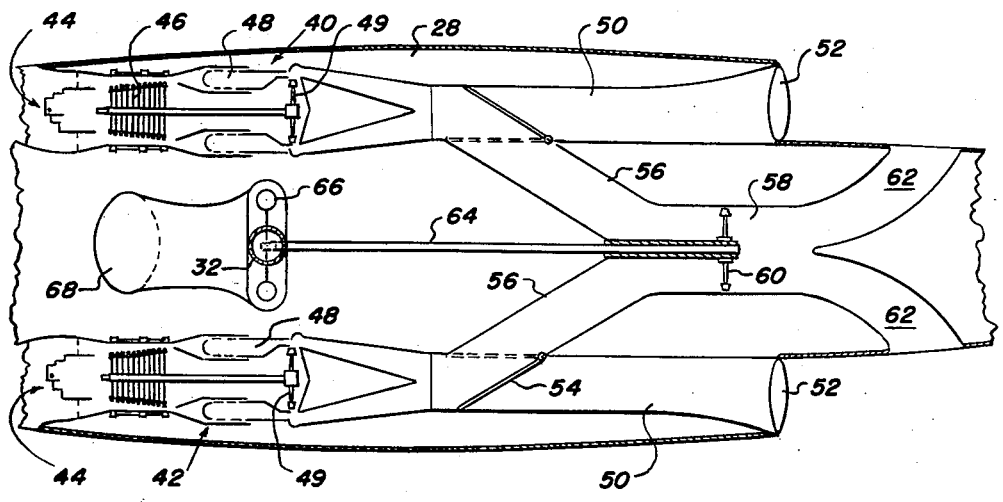
Fig. 3 is a schematic view taken substantially on a horizontal plane through a portion of the convertiplane illustrating the power plant arrangement in Fig. 1.

As shown in Figs. 1-3, the convertiplane embodying this invention includes an elongated fuselage 10 having conventional airplane wings 12 and 14 mounted on opposite sides thereof and the usual airplane empennage 16 including horizontal stabilizers 18, elevators 20, vertical stabilizers 26 and rudders 24. A pilot and passenger compartment 27 is provided forward of the wings and an engine compartment 28 is provided amidships.

The aircraft is also provided with a main sustaining rotor 29 which is mounted for rotation on the upper end of a hollow upright mast 32 projecting above the engine compartment 28, this rotor being of the reaction type driven by compressed air which is exhausted from nozzles at the tips of the rotor blades. The blades are supplied with air under pressure which is delivered through the hollow mast 32 and is conveyed through suitable conduits 36 in the blade spars 30 and discharged thru a nozzle tangentially of the rotor disc circle. If desired, additional fuel may be burned at the tips of the blades 34 for short periods of time to obtain additional thrust although in normal operation the compressed air discharged through these nozzles provides sufficient thrust to hover or climb the aircraft.

As shown in Fig. 3, two turbojet engines 40 and 42 are disposed in the bottom of engine compartment 28. Air for the engines is supplied through forwardly facing inlet passages 44 which lead to compressors 46. High pressure air from the compressors passes through burners 48 into turbines 49 which are shaft connected with and drive compressors 46 from which it is discharged axially through ducts 50 into nozzles 52, the air being ducted straight through the engine from inlet 44 to nozzle 52. A damper type valve 54 is provided in each duct 50 which when swung into the full line position shown in Fig. 3 diverts the exhaust gas from turbines 49 into oblique ducts 56. These ducts converge into a single duct 58 in which there is provided a free turbine 60. The discharge from the turbine 60 is diverted through passages 62 which discharge on opposite sides of the fuselage.

The turbine 60 drives an air compressor 66 by means of a small, high speed forwardly extended shaft 64. The compressor takes in air from a forwardly directed inlet 68 and compresses it for use in the rotor drive system. To this end, air from compressor 66 is delivered to the hollow mast 32 and from there is conveyed via a gas transfer assembly through ducts 36 in the blade spars to the rotor tip nozzles 34.

Figure 4:
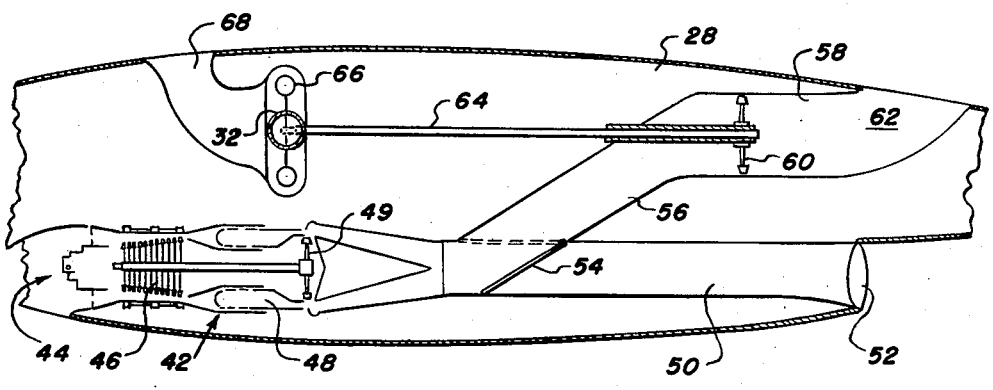
Fig. 4 is a view similar to Fig. 3 showing a modified power plant and mast arrangement.

The single engine modification shown in Fig. 4 is identical with the one shown in Figs. 1-3 except that a single engine is used which is located on one side of the aircraft and the turbine 60, shaft 64 and compressor 66 are located on the other side of the aircraft, thereby counterbalancing one another. Since the ducting is essentially the same, equivalent parts have been given the same numerals as those in the embodiment shown in Figs. 1-3.

The operation of the system is as follows. In forward flight when the aircraft is flying as an airplane the damper valves 54 located between the turbine 49 of the turbojet engines and the nozzles 52 are normally open, i.e., in the dotted position shown in the drawings, whereupon jet thrust is developed for forward propulsion. For helicopter flight a compressed air system is utilized by modifying the basic turbojet cycle. The damper valves 54 are turned to the full line position shown in the drawings so that the discharge from the turbines 49 is bypassed through ducts 56 to the remote turbine 60 which absorbs the energy flow enabling said turbine 60 to drive the free compressor 66 by means of the small high speed shaft 64. Compressed air developed by the compressor 66 is then delivered through the hollow mast 32 and through the ducts 36 to the blade nozzles 34 which provide the required thrust for helicopter operation. It will be understood that the nozzles 34 discharge substantially tangentially of the rotor disc circle to drive the rotor and since no torque is set up which reacts on the fuselage, except for the negligible friction in the rotor head bearing, no anti-torque device is shown, although some type of directional control device may be required, depending on the particular design of the aircraft. For instance, the efflux from exhausts 62 could be used for hovering directional control.

It will be evident that the propulsion system of this invention is particularly advantageous since the same basic turbojet power plant can be used for both hovering and forward flight. No gearing or heavy low speed shafting is involved and the oblique connecting ducts 56 are used only in hovering. The use of a remote free turbine permits flexible operation of the air compressor without changing operation of the turbojet engines which simplifies the power plant control problem.

It will be further evident that the power plant above-described provides a very simple and efficient solution to the propulsion problems for convertiplane aircraft since the turbojet engines can be used for both modes of flight and are especially adapted for high speed flight as an airplane.

While only two forms of the invention have been shown and described herein, it will be evident that many changes may be made in the construction and arrangement of the parts without departing from the scope of the invention.

We claim:
1. In a convertiplane aircraft, a fuselage, fixed wings on said fuselage for sustaining said aircraft in airplane flight, a lift reactor rotor mounted above said fuselage for rotation about a substantially vertical axis for helicopter flight, a turbojet engine in said fuselage, said engine having a compressor, combustion chamber and turbine, a discharge passage connected to said engine for the exhaust gases leaving said engine through said turbine, said discharge passage terminating in a nozzle for providing forward thrust for said aircraft, a diversion passage connected to said discharge passage at a point downstream from the turbine of said engine, a free turbine in said diversion passage, valve means movable into said discharge passage for directing substantially all of the exhaust gases of said engine through said nozzle or through said diversion passage into said free turbine, an air compressor coupled with said turbine, and duct means for conveying air under pressure from said last named air compressor to said rotor.

2. In a convertiplane aircraft, a fuselage, fixed wings on said fuselage for sustaining said aircraft in airplane flight, a lift reactor rotor mounted above said fuselage for rotation about a substantially vertical axis for helicopter flight, a turbojet engine in said fuselage, said engine having a compressor, combustion chamber and turbine, a discharge passage connected to said engine for the exhaust gases leaving said engine through said turbine, said discharge passage terminating in a nozzle, a diversion passage connected to said discharge passage at a point downstream from the turbine of said engine, a free turbine in said diversion passage, means movable into said discharge passage for preventing exhaust gases to pass therethrough to said nozzle, said means when positioned in said discharge passage directing substantially all of the exhaust gases of said engine through said diversion passage into said free turbine, and an air compressor coupled with said turbine and duct means for conveying air under pressure from said last named air compressor to said rotor.

3. In a convertiplane aircraft, a fuselage, fixed wings on said fuselage for sustaining said aircraft in airplane flight, a lift reaction rotor mounted above said fuselage for rotation about a substantially vertical axis for helicopter flight, a turbojet engine in said fuselage, said engine having a compressor, combustion chamber and turbine, means directing all of the air entering said engine into said compressor, said compressor having one outlet, means directing the outlet of said compressor only to said combustion chamber, means directing the outlet of said combustion chamber only to said turbine, a discharge passage for said engine terminating in a nozzle, means directing the outlet of said turbine only to said discharge passage, a diversion passage connected to said discharge passage and extending therefrom, a free turbine mounted in said diversion passage, valve means for directing the fluid from said engine through said nozzle or through said diversion passage, said valve means being movable between a position directing all of said fluid through said nozzle to a position directing all of said fluid through said diversion passage, a second compressor coupled with said free turbine, and duct means for conveying fluid under pressure from said second compressor to said rotor.

References Cited in the file of this patent
UNITED STATES PATENTS

| | | |
|---|---|---|
| 2,516,671 | Bowers | July 25, 1950 |
| 2,590,457 | Pouit | Mar. 25, 1952 |
| 2,650,666 | Dorand | Sept. 1, 1953 |
| 2,653,778 | Bennett | Sept. 29, 1953 |
| 2,654,993 | Owner | Oct. 13, 1953 |